(12) United States Patent
Seo et al.

(10) Patent No.: US 11,162,373 B2
(45) Date of Patent: Nov. 2, 2021

(54) COMPRESSOR AND GAS TURBINE INCLUDING THE SAME

(71) Applicant: DOOSAN HEAVY INDUSTRIES & CONSTRUCTION CO., LTD., Changwon-si (KR)

(72) Inventors: Junhyuk Seo, Pohang-si (KR); Jeongjin Lee, Bucheon-si (KR)

( * ) Notice: Subject to any disclaimer, the term of this patent is extended or adjusted under 35 U.S.C. 154(b) by 146 days.

(21) Appl. No.: 16/112,694

(22) Filed: Aug. 25, 2018

(65) Prior Publication Data
US 2019/0106995 A1    Apr. 11, 2019

(30) Foreign Application Priority Data

Oct. 11, 2017 (KR) .......................... 10-2017-0130153

(51) Int. Cl.
| | | |
|---|---|---|
| *F01D 5/30* | (2006.01) | |
| *F01D 5/06* | (2006.01) | |
| *F02C 7/18* | (2006.01) | |
| *F01D 5/14* | (2006.01) | |
| *F04D 29/32* | (2006.01) | |

(52) U.S. Cl.
CPC .......... *F01D 5/3007* (2013.01); *F01D 5/066* (2013.01); *F01D 5/143* (2013.01); *F02C 7/18* (2013.01); *F04D 29/324* (2013.01); *F05D 2240/80* (2013.01); *F05D 2250/181* (2013.01); *F05D 2250/231* (2013.01)

(58) Field of Classification Search
CPC .... F05D 2240/80; F01D 5/3007; F01D 5/143; F01D 5/14; F01D 5/145; F04D 29/326; F04D 29/324
See application file for complete search history.

(56) References Cited

U.S. PATENT DOCUMENTS

| 2,735,612 A | * | 2/1956 | Haussman | .............. F01D 5/143 415/208.1 |
| 3,047,268 A | * | 7/1962 | Leavitt | .................. F01D 5/3015 416/220 R |
| 4,460,314 A | * | 7/1984 | Fuller | ....................... F01D 5/26 416/145 |

(Continued)

FOREIGN PATENT DOCUMENTS

| JP | 2012-052526 A | 3/2012 |
| KR | 1020060087872 A | 8/2006 |

(Continued)

OTHER PUBLICATIONS

A Korean Office Action dated Oct. 2, 2018 in connection with Korean Patent Application No. 10-2017-0130153 which corresponds to the above-referenced U.S. application.

*Primary Examiner* — Courtney D Heinle
*Assistant Examiner* — Andrew Thanh Bui
(74) *Attorney, Agent, or Firm* — Harvest IP Law, LLP (57) ABSTRACT

Disclosed is a compressor including: a rotatably-mounted rotor disk including a slot in an outer circumference thereof; and a blade including a root member connected to fix to the slot of the rotor disk, an airfoil with a leading edge facing introduced air and a trailing edge, and a platform formed in between the root member and the airfoil to stably support the airfoil over the rotor disk, the blade further including first and second bumps being respectively formed on each end side of the platform to face the introduced air.

9 Claims, 8 Drawing Sheets

(56) References Cited

U.S. PATENT DOCUMENTS

| | | | | |
|---|---|---|---|---|
| 5,183,389 | A * | 2/1993 | Gilchrist | F01D 5/26 416/193 A |
| 5,271,718 | A * | 12/1993 | Mitchell, Jr. | F01D 5/22 416/215 |
| 6,290,465 | B1 * | 9/2001 | Lammas | F01D 5/141 416/219 R |
| 6,413,045 | B1 | 7/2002 | Dancer et al. | |
| 7,244,104 | B2 * | 7/2007 | Girgis | F01D 5/081 415/116 |
| 7,320,574 | B2 * | 1/2008 | Greim | F01D 5/225 415/170.1 |
| 8,152,436 | B2 * | 4/2012 | Glasspoole | F01D 5/3007 415/1 |
| 8,197,211 | B1 | 6/2012 | Liang | |
| 8,419,356 | B2 * | 4/2013 | Little | F01D 11/001 415/173.1 |
| 8,920,126 | B2 * | 12/2014 | Iida | F01D 5/143 416/189 |
| 9,039,375 | B2 * | 5/2015 | Kneeland | F01D 5/141 415/173.7 |
| 9,863,251 | B2 * | 1/2018 | Mahle | F01D 11/08 |
| 9,976,433 | B2 * | 5/2018 | Praisner | F01D 11/00 |
| 10,590,774 | B2 * | 3/2020 | Chouhan | F01D 11/001 |
| 10,633,985 | B2 * | 4/2020 | Garcia-Crespo | F01D 5/30 |
| 2012/0051930 | A1 * | 3/2012 | Pandey | F01D 5/145 416/223 A |
| 2013/0156562 | A1 * | 6/2013 | Mahle | F01D 5/143 415/191 |
| 2016/0186593 | A1 * | 6/2016 | Healy | F01D 11/008 416/182 |
| 2017/0074281 | A1 | 3/2017 | Li et al. | |

FOREIGN PATENT DOCUMENTS

| | | |
|---|---|---|
| KR | 100827055 B1 | 5/2008 |
| KR | 1020140067023 A | 6/2014 |

* cited by examiner

COMPRESSOR AND GAS TURBINE INCLUDING THE SAME

CROSS REFERENCE TO RELATED APPLICATIONS

The present application claims priority to Korean Patent Application No. 10-2017-0130153, filed Oct. 11, 2017. The disclosure of the above-listed application is hereby incorporated by reference herein in their entirety.

FIELD

The present disclosure relates to a compressor and a gas turbine including the compressor.

BACKGROUND

The statements in this section merely provide background information related to the present disclosure and do not constitute prior art.

Generally, a gas turbine is a combustion engine in which a mixture of fuel and air compressed by a compressor is combusted to produce a high temperature gas, which drives a turbine. The gas turbine is used to drive electric generators, aircraft, ships, trains, or the like.

The gas turbine generally includes a compressor, a combustor, and a turbine.

The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units (or parts), etc.

Here, blades in the compressor generally have a hydrodynamically streamlined shape along a rotating direction thereof to reduce rotating load against introduced compressed air.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an object of the present disclosure is to provide a compressor capable of coping with rotating loads of blades, and a gas turbine including the same.

In order to achieve the above object, in an aspect, the present disclosure provide a compressor including a rotatably-mounted rotor disk including a slot in an outer circumference thereof; and a blade including a root member connected to fix to the slot of the rotor disk, an airfoil with a leading edge facing an introduced air and a trailing edge, and a platform formed in between the root member and the airfoil to support the airfoil over the rotor disk. Herein the blade further includes first and second bumps are respectively formed on each end side of the platform to face the introduced air.

In another embodiment, the present invention provides a compressor including a rotatably-mounted rotor disk including a slot in an outer circumference thereof; and a blade having a root member connected to fix to the slot of the rotor disk, an airfoil with a leading edge facing an introduced air and a trailing edge, and a platform formed in between the root member and the airfoil to support the airfoil over the rotor disk. Herein an upper surface of the platform is form in a curved shape with a central protrusion provided in a longitudinal direction thereof. Herein the blade further includes a third bump, the third bump having a protrusion on the upper surface and directly below the leading edge.

In another aspect, the present invention provide a gas turbine including: a compressor compressing air; a combustor receiving the compressed air from the compressor, mixing the compressed air with fuel, and combusting a mixture of air and fuel to produce combustion gases; and a turbine being driven with the combustion gases produced from the combustor to generate power, wherein the compressor includes: a rotatably-mounted rotor disk including a slot in an outer circumference thereof; and a blade including a root member connected to fix to the slot of the rotor disk, an airfoil with a leading edge facing an introduced air and a trailing edge, and a platform formed in between the root member and the airfoil to support the airfoil over the rotor disk. Herein the blade further includes first and second bumps are respectively formed on each end side of the platform to face the introduced air.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Reference will now be made in greater detail to specific embodiments of the disclosure, wherein the specific embodiments may be modified in a variety of other forms. However, it should be understood that the present disclosure is not limited to the specific embodiments, but encompasses all of modifications, equivalents, and substitutes which are included in the spirit and technical scope of the claimed invention.

The terminology used herein is for the purpose of describing particular embodiments only and is not intended to limit the claimed invention. As used herein, the singular forms "a", "an", and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Hereinbelow, exemplary embodiments of the present disclosure will be described in detail with reference to the accompanying drawings. Wherever possible, the same reference numerals will be used throughout the drawings and the description to refer to the same or like parts. In the following description, it is to be noted that, when the functions of known elements and the detailed description of elements related with the present disclosure makes the gist of the present disclosure unclear, a detailed description of those elements will be omitted. When referring to the drawings, it should be understood that the shape and size of the elements shown in the drawings are exaggeratedly drawn to provide an easily understood description of the structure of the present disclosure.

Figure 1:
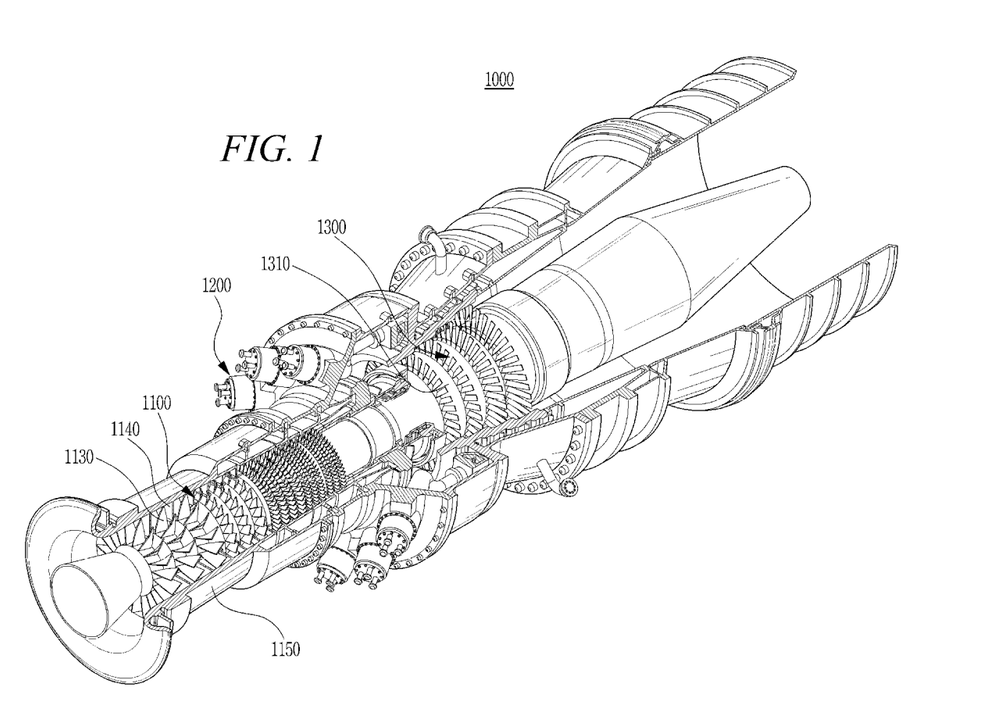
FIG. 1 is a perspective view illustrating a gas turbine with an inside exposed to the outside according to an exemplary embodiment of the present disclosure.
Figure 2:
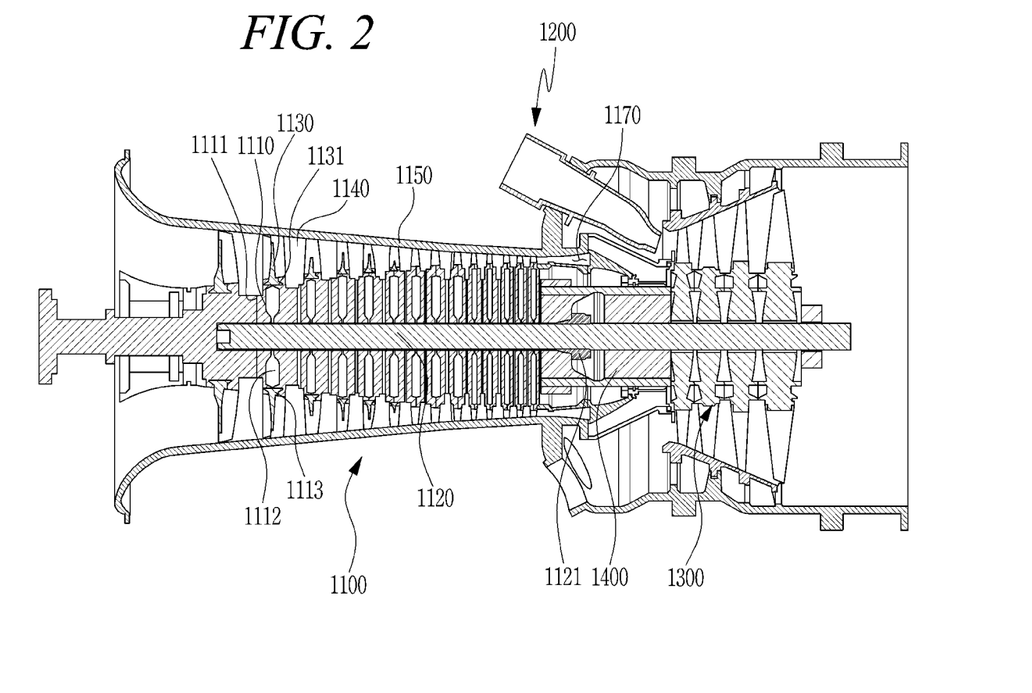
FIG. 2 is a conceptual sectional view illustrating the gas turbine.
Figure 3:
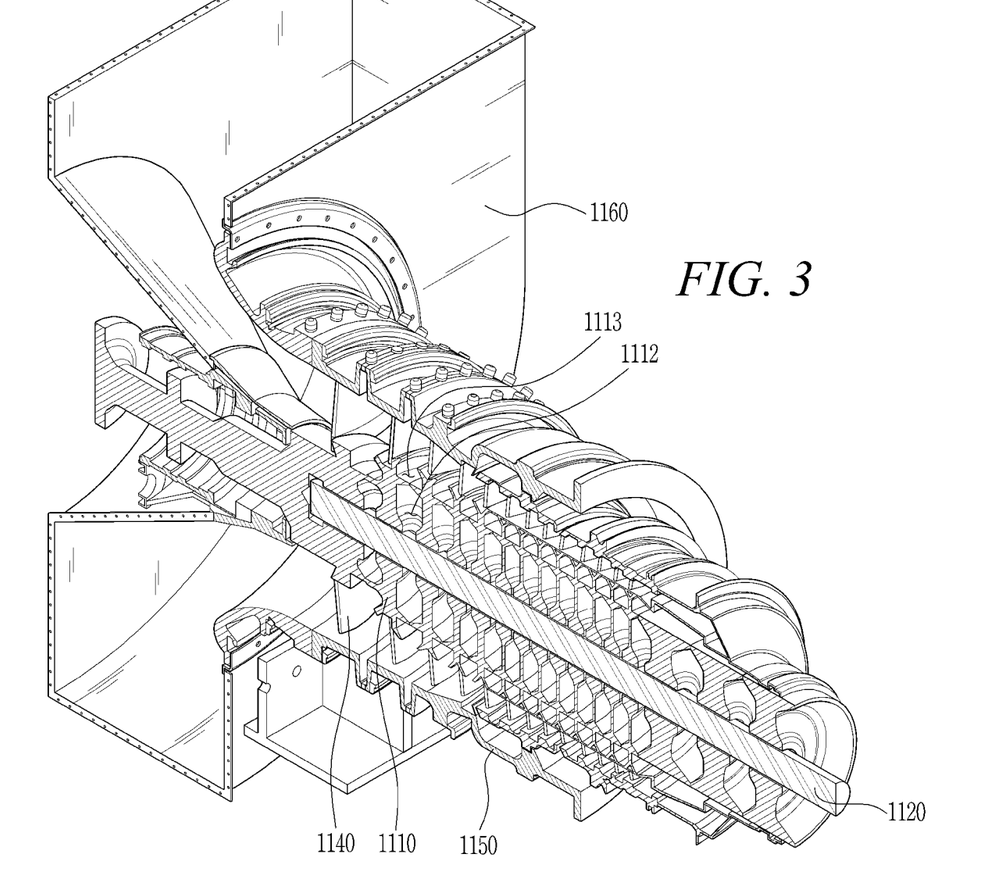
FIG. 3 is a perspective sectional view illustrating a compressor according to an exemplary embodiment of the present disclosure.

FIG. 1 is a perspective view illustrating a gas turbine with an inside exposed to the outside according to an exemplary embodiment of the present disclosure, FIG. 2 is a conceptual sectional view illustrating the gas turbine, and FIG. 3 is a perspective sectional view illustrating a compressor according to an exemplary embodiment of the present disclosure.

As illustrated in FIGS. 1 to 3, the gas turbine includes a compressor 1100, a combustor 1200, and a turbine 1300.

The compressor 1100 compresses intake air, and the combustor 1200 mixes fuel with the compressed air compressed by the compressor 1100 and combusts a mixture of air and fuel. The turbine 1300 has turbine blades 1310 mounted therein, which are rotated with the combustion gases from the combustor 1200.

The compressor 1100 includes a rotor disk 1110, a center tie rod 1120, blades 1130, vanes 1140, a compressor casing 1150, an intake 1160, and a diffuser 1170.

The rotor disk 1110 is fitted with blades 1130, and the center tie rod 1120 is fastened through the rotor disk 1110. The rotor disk 1110 rotates along with the rotation of the center tie rod 1120 to rotate the blades 1130. As an exemplary embodiment, the rotor disk 1110 is composed of a plurality of rotor disks.

The rotor disks 1110 are fastened to the center tie rod 1120 such that they are not movable in an axial direction of the center tie rod. The rotor disks 1110 are axially aligned with each other while being circumferentially fastened to the center tie rod 1120. As an exemplary embodiment, the rotor disk 1110 circumferentially has a plurality of protrusions (not shown) and a flange 1111 which is coupled to an adjacent rotor disk 1110 for simultaneous rotation with the adjacent rotor disk 1110.

At least one of the rotor disks 1110 has an air path 1112, through which the compressed air compressed by the blades 1130 of the compressor 1110 flows towards the turbine 1300 so as to cool the turbine blades 1310.

In an exemplary embodiment, a balancing member is additionally attached to the rotor disk 1110 for the balance of weight. The balancing member increases the stability of rotation of the rotor disk 1110. The rotor disk 1110 has a circumferential slot 1113.

The center tie rod 1120 is fixedly threaded through the rotor disks 1110 to align the rotor disks 1110. The center tie rod 1120 receives torque from the turbine 1300 to rotate the rotor disks 1110. To this end, a torque tube 1400 may be disposed between the compressor 1100 and the turbine 1300 as a torque transmission unit for transmitting torque generated from the turbine 1300 to the compressor 1100.

A first end of the center tie rod 1120 is fastened in a first rotor disk on the upstream side and a second end of the center tie rod is fastened in the torque tube 1400 by means of a press nut 1121. The press nut 1121 urges the torque tube 1400 towards the rotor disks 1110 so that the rotor disks 1110 come close to each other.

The blades 1130 are radially coupled to an outer circumference of the rotor disk 1110. The blades 1130 are provided in a multi-stage on the rotor disks 1110. While the blades 1130 are coupled through the slot of the rotor disk 1110 in the exemplary embodiment of the present disclosure, the coupling structure is not limited thereto, but may have other structures.

The blades 1130 rotate along with the rotation of the rotor disks 1110 to compress introduced air and move the compressed air towards rear stages. The air is gradually compressed to high pressure while it passes through the multi-stage blades. The blades 1130 are formed in plate shapes, and a radial length (in the radial direction of the rotor disk 1110) of the blades decreases from the second end to the first end of the center tie rod 1120, thereby compressing the introduced air.

The blades 1130 of the compressor 1100 are attached to the rotor disks 1110 while being circumferentially spaced apart from each other, so that, when the center tie rod 1120 rotates, the blades 1130 simultaneously rotate about the center tie rod 1120. The blades 1130 are arranged to provide a kinetic energy to the air flowing through the compressor 1100 when rotating about the center tie rod 1120.

Figure 4:
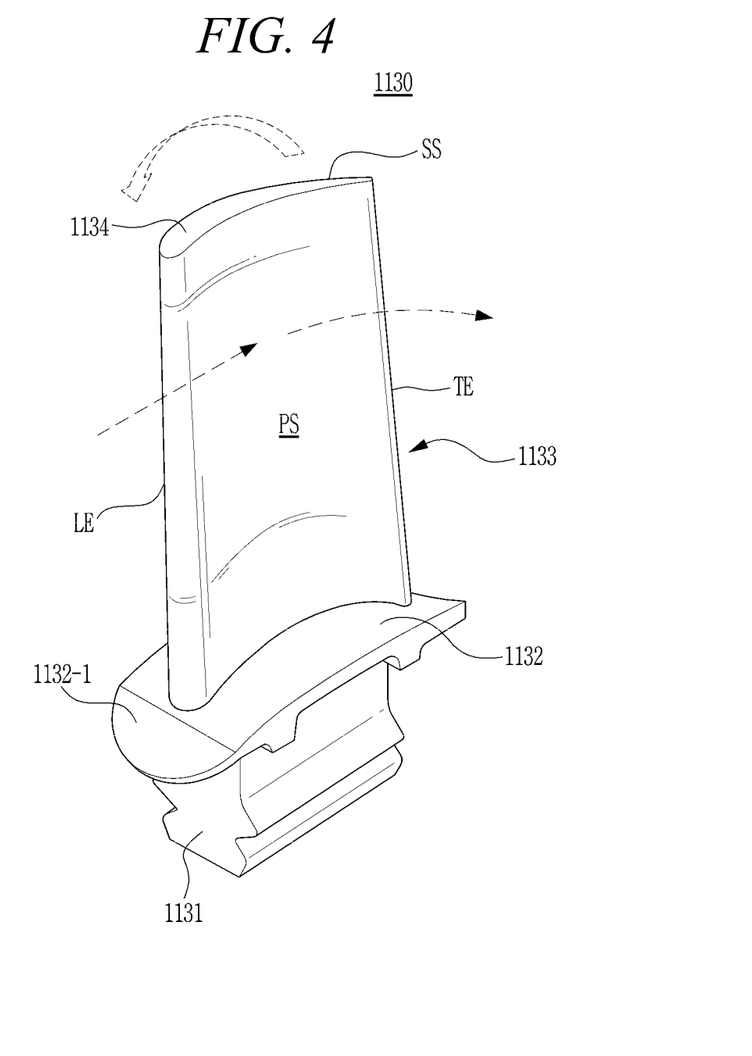
FIG. 4 is an enlarged perspective view illustrating a blade of the compressor shown in FIG. 2.
Figure 5:
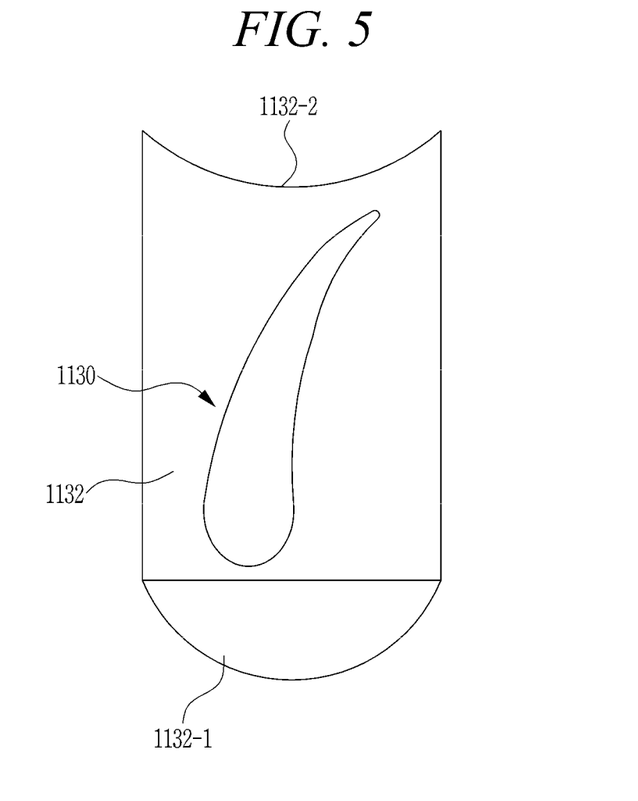
FIG. 5 is a plan view of FIG. 4.
Figure 6:
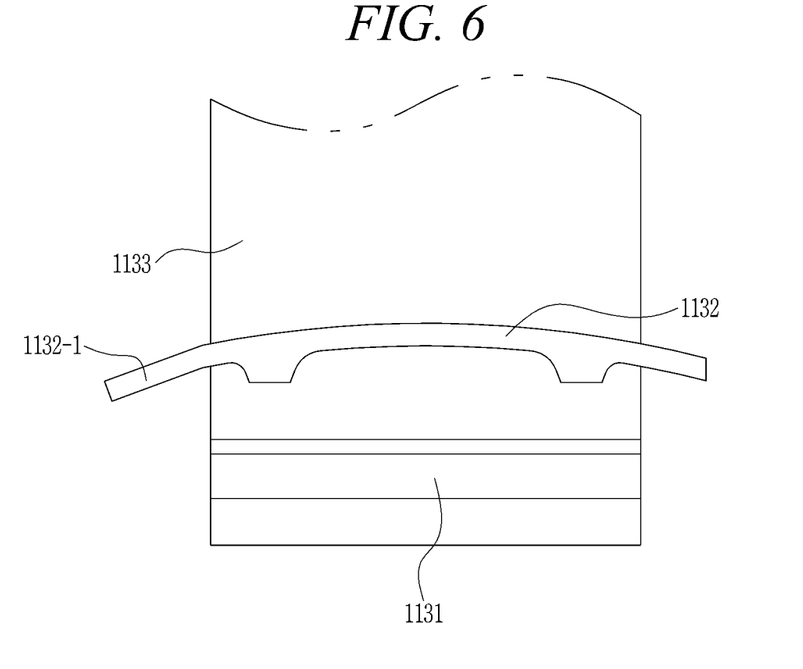
FIG. 6 is a side view of FIG. 4.

The blades 1130 of the compressor 1100 will now be hereinafter described in detail. FIG. 4 is an enlarged perspective view illustrating a blade of the compressor shown in FIG. 2, FIG. 5 is a plan view of FIG. 4, and FIG. 6 is a side view of FIG. 4.

As illustrated in FIG. 4, the blade 1130 includes a root member 1131, a platform 1132, an airfoil 1133, and a blade tip 1134.

The root member 1131 is a lower portion of the blade 1130 that has a symmetrical structure corresponding to the slot 1113 of the rotor disk 1110 such that the root member 1131 is securely connected to the slot 1113 of the rotor disk 1110. The shape of the root member, however, is not limited to, and also has other shapes to perform specific or dedicated functions of the present disclosure in an exemplary embodiment. The root member 1132 serves to firmly secure the blade 1130 which is fixed to the circumference of the rotor disk 1100 rotating during the operation of the compressor 1100.

The airfoil 1133 has a pressure surface (PS) extending from a leading edge (LE) to a trailing edge (TE) while facing the introduced air in an arrow direction shown in FIG. 4, being rotated counterclockwise as shown, and a suction surface (SS) opposite to the pressure surface (PS) and extending from the leading edge (LE) to the trailing edge (TE), thereby having a horizontal section of crescent. That is, the airfoil 1133 has a hydro-dynamically streamlined shape along a rotating direction thereof in order to reduce rotating load against the compressed air to be introduced to the blade 1130. The streamlined shape, however, is not limited to the crescent sectional shape. For example, the airfoil 1133 has a twisted shape that the pressure surface (PS) is in reverse to the suction surface (SS).

The blade tip 1134 is an upper portion of the airfoil 1133 that is disposed close to the compressor casing 1150 to reduce loss of inflow of air to be introduced through a gap with an inner surface of the compressor casing 1150.

The platform 1132 has a substantially rectangular planar shape of which lower side is supported by the circumference of the rotor disk 1110 when the root member 1131 is coupled through the slot 1113 of the rotor disk 1110 so that the platform 1132 can stably support the airfoil 1133 provided thereon.

Referring to FIG. 5, the platform 1132 has 'C'-type first and second bumps 1132-1, 1132-2 on longitudinally opposite ends thereof (in a direction of air being introduced). The first bump 1132-1 is disposed directly below the leading edge (LE) in a convex form in the longitudinal direction of the platform 1132. The second bump 1132-2 is disposed directly below the trailing edge (TE) in a concave form in the longitudinal direction of the platform 1132. Further, as illustrated in FIG. 6, an upper surface of the platform 1132 has a longitudinally curved protrusion (protruding in the direction of air being introduced) to allow an air flow to be concentrated on the airfoil 1133 of the blade 1130, thereby improving efficiency in compressing air performed by the compressor.

Figure 7:
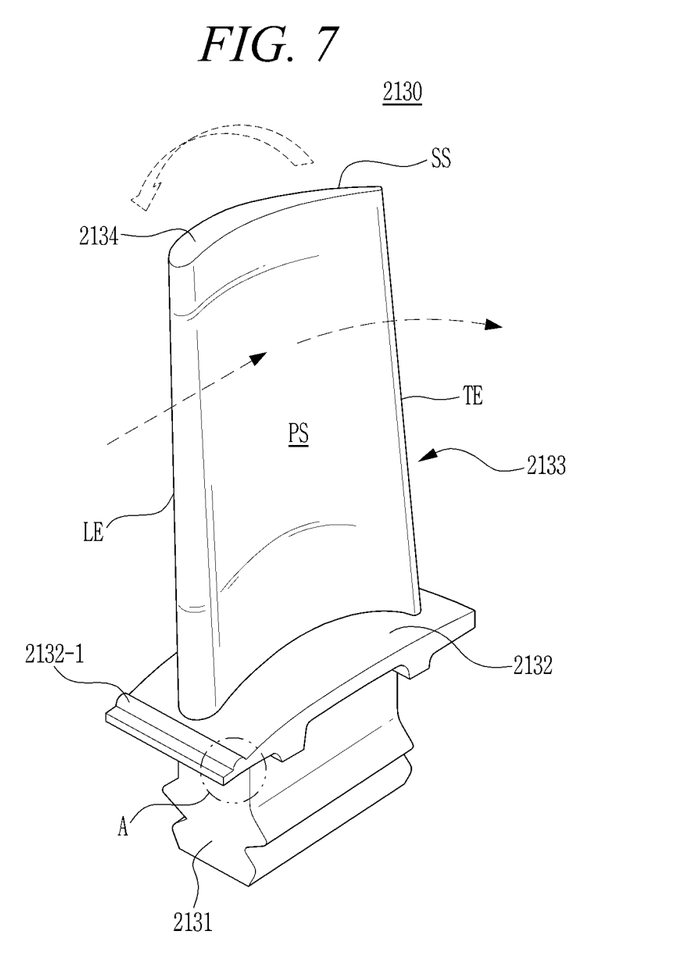
FIG. 7 is a perspective view illustrating another example of the blade of FIG. 2.
Figure 8:
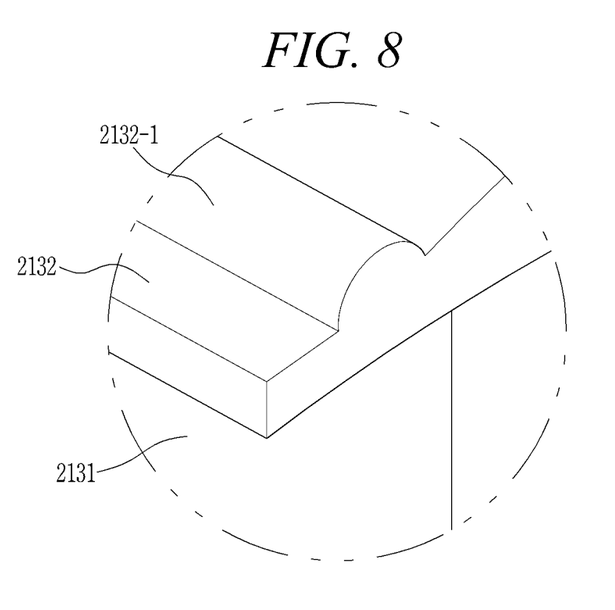
FIG. 8 is an enlarged view of section 'A' shown in FIG. 7.

FIG. 7 is a perspective view illustrating another example of the blade of FIG. 2, and FIG. 8 is an enlarged view of section 'A' shown in FIG. 7. The blade 2130 illustrated in FIGS. 7 and 8 includes a root member 2131, a platform 2132, and airfoil 2133, and a blade tip 2134.

The root member 2131 is a lower portion of the blade 2130 that has a geometrically symmetrical structure corresponding to a slot 1113 of a rotor disk 1110 in FIG. 2. The root member 2132 serves to firmly secure the blade 2130 which is fixed to the circumference of the rotor disk 1100 rotating during the operation of the compressor 1100.

The airfoil 2133 has a pressure surface (PS) extending from a leading edge (LE) to a trailing edge (TE) while facing the introduced air in an arrow direction, being rotated counterclockwise as shown in FIG. 7, and a suction surface (SS) opposite to the pressure surface (PS) and extending from the leading edge (LE) to the trailing edge (TE), thereby having a hydrodynamic shape with the pressure surface (PS). That is, the airfoil 2133 has a hydrodynamically streamlined shape along a rotating direction thereof in order to reduce rotating load against the compressed air to be introduced to the blade 2130.

The blade tip 2134 is an upper portion of the airfoil 2133 that is disposed close to a compressor casing 1150 to reduce loss of an air flow introduced through a gap with an inner surface of the compressor casing 1150.

The platform 2132 has a substantially rectangular planar shape of which lower side is supported by the circumference of the rotor disk 2110 when the root member 2131 is coupled through the slot 1113 of the rotor disk 1110 so that the platform 2132 can stably support the airfoil 2133 provided thereon. Further, an upper surface of the platform 2132 has a longitudinally curved protrusion (protruding in the direction of an air flow being introduced), and a third bump 2132-1 protruded thereon and directly below the leading edge (LE).

While the third bump 2132-1 shown in FIG. 8 is illustrated as linearly extending in a width direction of the platform 2132 while having a semi-circular shape in the longitudinal direction of the platform 2132, the present disclosure is not limited thereto, but may be modified into a variety of other forms.

While the above-mentioned blades 1130, 2130 are illustrated as being applied to the rotor disks 1110 of the compressor 1100, a person skilled in the art can understand that the blades can also be applied to a turbine 1300 having a similar assembly structure to those of the compressor.

Vanes 1140 shown in FIGS. 1 and 3 are attached to the inside of the housing 1150 in a multi-stage form. Vanes 1140 serve to guide a compressed air from front-stage blades 1130 towards rear-stage blades 1130.

Vanes 1140 consist of inlet vanes for providing start stability and protecting the operation of the compressor at the start and stop of a gas turbine, and variable vanes disposed at the back of the inlet vanes while having a similar structure to the inlet vanes, for precisely regulating an amount of the introduced air, thereby improving efficiency of a turbine. The inlet vanes and the variable vanes are installed to the compressor casing 1150 such that they can be separately controlled and rotatable by respective actuators.

The compressor casing 1150 forms a contour of the compressor 1100. The compressor casing 1150 accommodates the rotor disks 1110, the center tie rod 1120, the blades 1130, the vanes 1140, and the like, Connection tubes are provided to the compressor casing 1150 to allow the compressed air compressed by the multi-stage blades 1130 to flow towards the turbine 1300, thereby cooling turbine blades.

The intake 1160 is disposed at an inlet of the compressor 1100 to allow external air to be introduced into the compressor 1100. The diffuser 1170 is disposed at an outlet of the compressor 1100 to allow the compressed air to be diffused and moved. The diffuser 1170 converts a portion of kinetic energy of the compressed air to static pressure before the compressed air from the compressor 1100 is fed to the combustor 1200. The compressed air passed through the diffuser 1170 is fed to the combustor 1200.

According to the compressor and the gas turbine including the same, the shape of the platform of the blade is improved to allow an air flow to be concentrated on the airfoil of the blade, thereby improving efficiency in compressing air performed by the compressor.

As exemplary embodiments of the present disclosure have been described for illustrative purposes, it will be appreciated by those skilled in the art that the embodiments of the present disclosure described above are merely illustrative and that various modifications and equivalent embodiments are possible without departing from the scope and spirit of the claimed invention. Specific terms used in this disclosure and drawings are used for illustrative purposes and not to be considered as limitations of the present disclosure. Therefore, it will be appreciated that the present disclosure is not limited to the form set forth in the foregoing description. Accordingly, the scope of technical protection of the claimed invention is determined by the technical idea of the appended claims. One of ordinary skill would understand that the present disclosure covers all modifications, equivalents, and alternatives falling within the spirit and the scope of the claimed invention as defined by the appended claims.

What is claimed is:
1. A compressor comprising:
   a rotatably-mounted rotor disk having an outer circumference in which a slot is formed; and
   a blade including
   a root member connected to fix to the slot of the rotor disk,
   an airfoil with a leading edge facing introduced air and a trailing edge disposed opposite to the leading edge, and a platform formed between the root member and the airfoil to support the airfoil, the platform having a substantially rectangular planar shape and comprising:
- first and second bumps respectively formed on each end side of the platform to face the introduced air,
- an upper surface including a longitudinally curved central protrusion that is curved in a longitudinal direction of the platform and protrudes toward a direction of the introduced air to concentrate an airflow on the airfoil, the longitudinally curved central protrusion being convexly formed in the center the upper surface and extending from a leading edge side of the platform to a trailing edge side of the platform, and
- a lower surface having a concavely curved shape and facing the outer circumference of the rotor disk, wherein the lower surface of the platform is curved in the longitudinal direction and is supported by the outer circumference of the rotor disk when the root member is coupled through the slot of the rotor disk, wherein the first bump forms a C-type protrusion that protrudes axially away from the leading edge of the airfoil, wherein the upper surface of the platform comprises:
- a first portion that is disposed upstream of the leading edge of the airfoil and includes the first bump, the first portion further including a flat surface having a first slope in the longitudinal direction, and
- a second portion that is disposed immediately adjacent to the first portion and includes the second bump, the second portion further including a curvature having a second slope in the longitudinal direction, wherein the first slope is different than the second slope, and wherein the lower surface of the platform comprises two projections spaced apart at position corresponding to the second portion which project toward the outer circumference of the rotor disk.

2. The compressor according to claim 1, wherein the airfoil has a streamlined shape along a rotating direction of the rotor disk.

3. The compressor according to claim 2, wherein the airfoil has a pressure surface facing the introduced air and a suction surface opposite to the pressure surface.

4. The compressor according to claim 1, wherein the second bump forms a C-type protrusion that protrudes axially toward the trailing edge of the airfoil.

5. A gas turbine comprising:
- a compressor configured to compress air;
- a combustor configured to receive the compressed air from the compressor, mix the compressed air with fuel, and combust a mixture of air and fuel to produce combustion gases; and
- a turbine configured to be driven with the combustion gases produced from the combustor to generate power, wherein the compressor comprises:
- a rotatably-mounted rotor disk having an outer circumference in which a slot is formed; and
- a blade including
  - a root member connected to fix to the slot of the rotor disk,
  - an airfoil with a leading edge facing introduced air and a trailing edge disposed opposite to the leading edge, and
  - a platform formed between the root member and the airfoil to support the airfoil, the platform having a substantially rectangular planar shape and comprising:
    - first and second bumps respectively formed on each end side of the platform to face the introduced air,
    - an upper surface including a longitudinally curved central protrusion that is curved in a longitudinal direction of the platform and protrudes toward a direction of the introduced air to concentrate an airflow on the airfoil, the longitudinally curved central protrusion being convexly formed in the center the upper surface and extending from a leading edge side of the platform to a trailing edge side of the platform, and
    - a lower surface having a concavely curved shape and facing the outer circumference of the rotor disk, wherein the lower surface of the platform is curved in the longitudinal direction and is supported by the outer circumference of the rotor disk when the root member is coupled through the slot of the rotor disk, wherein the first bump forms a C-type protrusion that protrudes axially away from the leading edge of the airfoil, wherein the upper surface of the platform comprises:
- a first portion that is disposed upstream of the leading edge of the airfoil and includes the first bump, the first portion further including a flat surface having a first slope in the longitudinal direction, and
- a second portion that is disposed immediately adjacent to the first portion and includes the second bump, the second portion further including a curvature having a second slope in the longitudinal direction, wherein the first slope is different than the second slope, and wherein the lower surface of the platform comprises two projections spaced apart at position corresponding to the second portion which project toward the outer circumference of the rotor disk.

6. The gas turbine according to claim 5, wherein the airfoil has a streamlined shape along a rotating direction of the rotor disk.

7. The gas turbine according to claim 6, wherein the airfoil has a pressure surface facing the introduced air and a suction surface opposite to the pressure surface.

8. The gas turbine according to claim 5, wherein the second bump forms a C-type protrusion that protrudes axially toward the trailing edge of the airfoil.

9. A compressor comprising:
- a rotatably-mounted rotor disk having an outer circumference in which a slot is formed; and
- a blade including
  - a root member connected to fix to the slot of the rotor disk,
  - an airfoil with a leading edge facing introduced air and a trailing edge disposed opposite to the leading edge,
  - a platform formed between the root member and the airfoil to support the airfoil,
  - a first bump formed on a leading edge side of the platform and convexly curved to face in a direction of the introduced air, the first bump including a convexly curved surface having a first end communicating with a leading edge end of a first axially extending side of the platform and a second end communicating with a leading edge end of a second axially extending side of the platform, and a second bump formed on a trailing edge side of the platform and concavely curved to face in the direction of the introduced air, the second bump including a concavely curved surface having a first end communicating with a trailing edge end of the first axially extending side of the platform and a second end communicating with a trailing edge end of the second axially extending side of the platform, wherein each of the first and second bumps extends in a radial direction away from an upper surface of the platform, and wherein the platform has a substantially rectangular planar shape and comprises:

an upper surface including a longitudinally curved central protrusion that is curved in a longitudinal direction of the platform and protrudes toward a direction of the introduced air to concentrate an airflow on the airfoil, the longitudinally curved central protrusion being convexly formed in the center the upper surface and extending from a leading edge side of the platform to a trailing edge side of the platform, and a lower surface having a concavely curved shape and facing the outer circumference of the rotor disk, wherein the lower surface of the platform is curved in the longitudinal direction and is supported by the outer circumference of the rotor disk when the root member is coupled through the slot of the rotor disk, wherein the upper surface of the platform comprises:

a first portion that is disposed upstream of the leading edge of the airfoil and includes the first bump, the first portion further including a flat surface having a first slope in the longitudinal direction, and a second portion that is disposed immediately adjacent to the first portion and includes the second bump, the second portion further including a curvature having a second slope in the longitudinal direction, wherein the first slope is different than the second slope, and wherein the lower surface of the platform comprises two projections spaced apart at position corresponding to the second portion which project toward the outer circumference of the rotor disk.

\* \* \* \* \*